(12) United States Patent
English

(10) Patent No.: US 7,058,035 B2
(45) Date of Patent: Jun. 6, 2006

(54) COMMUNICATION SYSTEM EMPLOYING MULTIPLE HANDOFF CRITERIA

(75) Inventor: Sean English, Encinitas, CA (US)

(73) Assignee: QUALCOMM, Indorporated, San Diego, CA (US)

( * ) Notice: Subject to any disclaimer, the term of this patent is extended or adjusted under 35 U.S.C. 154(b) by 776 days.

(21) Appl. No.: 09/895,663

(22) Filed: Jun. 29, 2001

(65) Prior Publication Data

US 2003/0002460 A1    Jan. 2, 2003

(51) Int. Cl.
*H04Q 7/20*    (2006.01)

(52) U.S. Cl. .................. 370/332; 455/437; 455/442

(58) Field of Classification Search ............... 370/331, 370/332, 333, 335, 336, 337; 455/436, 437, 455/442

See application file for complete search history.

(56) References Cited

U.S. PATENT DOCUMENTS

| | | | |
|---|---|---|---|
| 5,056,109 A | | 10/1991 | Gilhousen et al. |
| 5,267,261 A | | 11/1993 | Blakeney, II et al. |
| 5,504,773 A | | 4/1996 | Padovani et al. |
| 5,568,483 A | | 10/1996 | Padovani et al. |
| 5,751,725 A | | 5/1998 | Chen |
| 5,923,650 A | | 7/1999 | Chen et al. |
| 5,946,621 A | * | 8/1999 | Chheda et al. ............... 455/440 |
| 5,999,522 A | * | 12/1999 | Rohani ........................ 370/331 |
| 6,002,933 A | * | 12/1999 | Bender et al. ............... 455/442 |
| 6,151,502 A | | 11/2000 | Padovani et al. |
| 6,157,668 A | | 12/2000 | Gilhousen et al. |
| 6,175,590 B1 | | 1/2001 | Stein |
| 6,393,276 B1 | * | 5/2002 | Vanghi ...................... 455/422.1 |
| 6,507,568 B1 | * | 1/2003 | Kumar et al. ............... 370/329 |
| 6,535,738 B1 | * | 3/2003 | Bomar et al. ............... 455/436 |
| 6,768,908 B1 | * | 7/2004 | Jalloul et al. ............... 455/442 |
| 2002/0197997 A1 | * | 12/2002 | Attar et al. .................. 455/446 |

FOREIGN PATENT DOCUMENTS

| | | |
|---|---|---|
| EP | 1043908 | 10/2000 |
| WO | 9923844 | 5/1999 |
| WO | 0054540 | 9/2000 |
| WO | 0147309 A2 | 6/2001 |
| WO | 0147309 A3 | 6/2001 |

* cited by examiner

*Primary Examiner*—Min Jung
(74) *Attorney, Agent, or Firm*—Philip R. Wadsworth; Thien T. Nguyen; Roberta A. Young

(57) ABSTRACT

Disclosed herein is a communication system which manages guarantee of service (GOS) requirements for various users while efficiently managing backhaul network traffic and optimizing overall system capacity. In one aspect, armed handoff is used to transmit forward link data from a single base station to a particular mobile station as long as certain minimum requirements are met, such as minimum data throughput, minimum data rate, and GOS requirements. If these criteria are not met, soft and softer handoff can be employed to transmit forward link data from one or more base stations to a particular mobile station until the conditions for armed handoff are met. In another aspect, the test to add a base station sector to the active set differs based on whether other sectors of that base station already exist in the active set. The test is less stringent when a sector is not the first of its base station to enter the active set, and more stringent when it is the first.

21 Claims, 5 Drawing Sheets

COMMUNICATION SYSTEM EMPLOYING MULTIPLE HANDOFF CRITERIA

BACKGROUND

1. Field

The present invention relates generally to data communication, and more specifically to a novel and improved method and apparatus for a communication system employing multiple handoff criteria.

2. Background

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the "TIA/EIA-98-C Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (4) the standard offered by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (5) some other standards. These named standards are incorporated herein by reference. A system that implements the High Rate Packet Data specification of the cdma2000 standard is referred to herein as a high data rate (HDR) system. The HDR system is documented in TIA/EIA-IS856, "CDMA2000 High Rate Packet Data Air Interface Specification", and incorporated herein by reference. Proposed wireless systems also provide a combination of HDR and low data rate services (such as voice and fax services) using a single air interface.

Given the growing demand for wireless data applications, the need for very efficient wireless data communication systems has become increasingly important. There are many differences between voice and data services. One significant difference between voice services and data services is the fact that the former imposes stringent and fixed delay requirements. Typically, the overall one-way delay of speech frames must be less than 100 msec. In contrast, the data delay can be a variable parameter used to optimize the efficiency of the data communication system. Specifically, more efficient error correcting coding techniques which require significantly larger delays than those that can be tolerated by voice services can be utilized. An exemplary efficient coding scheme for data is disclosed in U.S. Pat. No. 5,933,462, entitled "SOFT DECISION OUTPUT DECODER FOR DECODING CONVOLUTIONALLY ENCODED CODEWORDS", issued Aug. 3, 1999, assigned to the assignee of the present invention and incorporated by reference herein.

A second significant difference between voice services and data services is that the former requires a fixed and common grade of service (GOS) for all users. Typically, for digital systems providing voice services, this translates into a fixed and equal transmission rate for all users and a maximum tolerable value for the error rates of the speech frames. In contrast, for data services, the GOS can be different from user to user and can be a parameter optimized to increase the overall efficiency of the data communication system. The GOS of a data communication system for a user is typically defined as the total delay incurred in the transfer of a predetermined amount of data, hereinafter referred to as a data packet.

A third significant difference between voice services and data services is that the former requires a reliable communication link which, in the exemplary CDMA communication system, is provided by soft handoff. Soft handoff results in redundant transmissions from two or more base stations to improve reliability. A variety of soft handoff techniques are known in the art, and specific techniques are detailed below. Because data is transmitted at high rates, the effects of soft handoff on system capacity is severe. In addition, packets received in error can be retransmitted. For data services, the transmit power used to support soft handoff can often be more efficiently used for transmitting additional data. An exemplary system employing soft handoff is disclosed in U.S. Pat. No. 5,056,109, entitled Method and Apparatus for Controlling Transmission Power in a CDMA Cellular Mobile Telephone System" issued Oct. 8, 1991, assigned to the assignee of the present invention and incorporated by reference herein.

The most important parameters which measure the quality and effectiveness of a data communication system are the transmission delay required to transfer a data packet and the average throughput rate of the system. Transmission delay does not have the same impact in data communication as it does for voice communication, but it is an important metric for measuring the quality of the data communication system. The average throughput rate is a measure of the efficiency of the data transmission capability of the communication system. Factors involved in measuring the quality and effectiveness of data service to a particular user include maximum or minimum throughput rates to the user while that user has access to the communication channel, as well as the frequency of access granted to that user. These factors are relevant in providing a certain GOS to the user.

In CDMA systems, the signal-to-noise-and-interference ratio (C/I) of any given user is a function of the location of the user within the coverage area. The C/I that any given user's mobile station achieves on a particular link from the base station determines the information rate that can be supported by that link. Given a specific modulation and error correction method used for the transmission, a given level of performance is achieved at a corresponding level of C/I. The C/I achieved by any given user is a function of the path loss, which for terrestrial cellular systems increases as $r^3$ to $r^5$, where r is the distance to the radiating source. Furthermore, the path loss is subject to random variations due to man-made or natural obstructions within the path of the radio wave. The optimal performance occurs when the mobile station is served by the best base station, defined in terms of the largest C/I value received.

A system similar to an HDR system is disclosed in U.S. Pat. No. 6,574,211 (hereinafter the '211 patent), entitled "METHOD AND APPARATUS FOR HIGHER RATE PACKET DATA TRANSMISSION", issued Jun. 3, 2003, assigned to the assignee of the present invention and incorporated by reference herein. In systems such as these, the characteristics, described above, that differentiate data communications from voice communications are exploited to provide efficient high speed wireless data transfer. These systems are summarized as follows.

Each mobile station communicates with one or more base stations and monitors the control channels for the duration of the communication with the base stations. The control channels can be used by the base stations to transmit small amounts of data, paging messages addressed to a specific mobile station, and broadcast messages to all mobile stations. The paging message informs the mobile station that the base station has data to transmit to the mobile station.

Upon receipt of the paging messages from one or more base stations, the mobile station measures the signal-to-noise-and-interference ratio (C/I) of the forward link signals (e.g. the forward link pilot signals) and selects the best base station using C/I measurements. C/I can be measured at the mobile station using a variety of known techniques, such as measuring a pilot signal, a broadcast channel, or any known signal from a base station. At each time slot, the mobile station transmits to the selected base station on a dedicated data request (DRC) channel a request for transmission at the highest data rate which the measured C/I can reliably support. The selected base station transmits data, in data packets, at a data rate not exceeding the data rate requested by the mobile station on the DRC channel. By transmitting from the best base station at every time slot, improved throughput and transmission delay are achieved.

The selected base station transmits at the peak transmit power for the duration of one or more time slots to a mobile station at the data rate requested by the mobile station. In CDMA voice communication systems, such as IS-95, the base stations operate at a predetermined back-off (e.g. 3 dB) from the available transmit power to account for variations in usage. Thus, the average transmit power is half of the total available power. However, in data systems such as HDR and that described in the '211 patent, data transmissions are scheduled in advance, it is not necessary to back-off from the available peak transmit power.

The ability to transmit from different base stations from time slot to time slot allows such data communication systems to quickly adapt to changes in the operating environment. In addition, the ability to transmit a data packet over non-contiguous time slots is possible through the use of sequence numbers to identify the data units within a data packet. Accomplishing this can introduce complexity, however, since often base stations independently select rates, and other base stations often can't read the DRC, so other base stations can be unaware of how much data is transmitted in any given slot. Often this task must be carried out via ACKs and NACKs (described in further detail below). In addition to sending a sequence number (or packet ID), an ID plus a rate may need to be delivered. On the backhaul, a base station can send a message including the packet ID and the quantity of data delivered in that packet.

Such systems increase flexibility by forwarding the data packets addressed to a specific mobile station from a central controller to all base stations which are members of the active set of the mobile station. The active set is a set of base stations selected from those neighboring a mobile station, typically selected based on the quality of the signals received at the mobile station. In these systems, data transmission can occur from any base station in the active set of the mobile station at each time slot. Due to the complex requirements of maintaining data queues in many base stations, and the associated backhaul traffic, the frequency with which mobile stations can select new base stations for transmission may be limited to minimize these effects. For example, a mobile may be required to stay with a particular base station for a given number of time slots, a certain time duration, or for a particular amount of data transmitted.

By queuing forward link traffic data to a variety of base stations, typically those contained in a mobile station's active set, one or more of these base stations can transmit data to the mobile station with minimal processing delay. The overall capacity of the system can be increased by reducing the forward link transmit power to any particular mobile station. Thus, system capacity is optimized by reducing transmit power directed to a mobile station by those base stations in the active set, as well as directing only a subset of the active set to transmit to that mobile station, such that the minimum C/I required is received at the mobile station. The technique of queuing data to a variety of base stations, and then directing a subset of them to transmit based on the specific mobile station's environment is known as armed handoff. A description of armed handoff is disclosed in co-pending U.S. Pat. No. 6,307,849, entitled "METHOD AND APPARATUS FOR CHANGING FORWARD TRAFFIC CHANNEL POWER ALLOCATION", issued Oct. 21, 2001, assigned to the assignee of the present invention and incorporated by reference herein.

As described above, data systems such as HDR and that described in the '211 patent maximize throughput by scheduling the entire forward link channel for transmission to a specific user. Armed handoff is utilized with the limitation that only a single base station from the active set transmits during each time slot. Therefore, the power that would be required to allow soft handoff is redirected for use in data transmission. While this technique may optimize overall system capacity, issues can arise if providing a minimum GOS for particular users is desired. For example, in a deployed system, there may be geographical locations where the maximum C/T received by a mobile station from any one base station allows only a relatively low data transfer rate to the mobile station. This situation may arise due to the physical locations of the base stations in conjunction with various natural or man-made obstructions in the transmission paths. It may be that the desired GOS for that user can be attained by allocating additional medium access time for that user, i.e, assigning it additional time slots. In this case, servicing chat mobile station may significantly reduce the capacity of that portion of the network. In the extreme case, however, even continuously allocating the entire forward link from any one base station may not provide enough throughput required to provide the desired GOS for that user. In these cases, allowing more than one base station to transmit forward link data simultaneously (i.e. soft handoff) may provide the additional C/I required to achieve the desired GOS to the particular mobile station while increasing overall capacity available to other users. A retransmission mechanism can be employed for data units received in error. In systems such as HDR and that described in the '211 patent, each data packet comprises a predetermined number of data units, with each data unit identified by a sequence number. Upon incorrect reception of one or more data units, the mobile station sends a negative acknowledgment (NACK) on the reverse link data channel indicating the sequence numbers of the missing data units for retransmission from the base station. The base station receives the NACK message and retransmits the data units received in error.

Note that the benefits of allowing different base stations to transmit portions of the forward link data during various time slots as well as the retransmission mechanism require some coordination to maintain the queues in the various base stations contained in the active set. As an example, suppose a first base station is selected to transmit the first segment of data from its queue to a mobile station. After transmitting this data, the first base station knows that the second segment of data in its queue should be transmitted next, barring a retransmission request for the first segment. Suppose further that, after the first segment of data is transmitted from the first base station, the mobile environment changes such that a second base station is selected for a subsequent transmission. There must be coordination such that the second base station knows to transmit the second segment as opposed to the first. This coordination introduces some complexity as well as network traffic on the backhaul network (that is, the network between the base station controller and the various base stations). Backhaul network traffic is increased as more base stations are introduced to an active set, since coordination messaging increases proportionally, as well as delivering the forward link traffic data for storage in the additional base station's queue. Furthermore, it is clear that as data systems achieve higher data rates, the required data transfer on the backhaul network can increase dramatically.

Base station candidates for a mobile station's active set can be selected according to a variety of techniques. One such technique is disclosed in U.S. Pat. No. 6,151,502 (hereinafter the '502 patent), entitled "METHOD AND APPARATUS FOR PERFORMING SOFT HANDOFF IN A WIRELESS COMMUNICATION SYSTEM", assigned to the assignee of the present invention and incorporated by reference herein. Using this technique, a base station can be added to the active set of the mobile station if the received pilot signal is above a predetermined add threshold and dropped from the active set if the pilot signal is below a predetermined drop threshold. Alternatively, the base station can be added to the active set if the additional energy of the base station (e.g. as measured by the pilot signal) and the energy of the base stations already in the active set exceeds a predetermined threshold. Using this alternative technique, a base station whose transmitted energy comprises an insubstantial amount of the total received energy at the mobile station is not added to the active set.

It is well known in the art that soft handoff techniques and active set selection techniques apply to sectors within a base station as well as to base stations themselves. However, the issues regarding backhaul network congestion described previously do not apply equally to sectors within a base station. This is because multiple sectors within a base station can share a common queue of forward link data. Therefore, when a sector of a base station is added to an active set already containing another sector of that base station, additional forward link data does not need to be delivered on the backhaul network. Furthermore, complexity arising from coordination of transmitted data from that base station's queue among that base station's sectors is less than that required for coordination of transmitted data between base stations.

As described above, wireless data users require high speed data transmission, and may have certain minimum grade of service (GOS) requirements. There is therefore a need in the art for communication systems which can provide maximum quality service for all users while efficiently managing backhaul network traffic and optimizing overall system capacity.

SUMMARY

Embodiments disclosed herein address the need for communication systems which manage grade of service (GOS) requirements for various users while efficiently managing backhaul network traffic and optimizing overall system capacity. In one aspect, armed handoff is used to transmit forward link data from a single base station to a particular mobile station as long as certain minimum requirements are met, such as minimum data throughput, minimum data rate, and GOS requirements. If these criteria are not met, soft and softer handoff can be employed to transmit forward link data from one or more base stations to a particular mobile station until the conditions for armed handoff are met. In another aspect, the test to add a base station sector to the active set differs based on whether other sectors of that base station already exist in the active set. The test is less stringent when a sector is not the first of its base station to enter the active set, and more stringent when it is the first. These aspects have the benefit of providing ways to optimize system capacity while delivering varying desired GOS levels, and reducing the complexity of and minimizing traffic on the backhaul network. Various other aspects of the invention are also presented.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
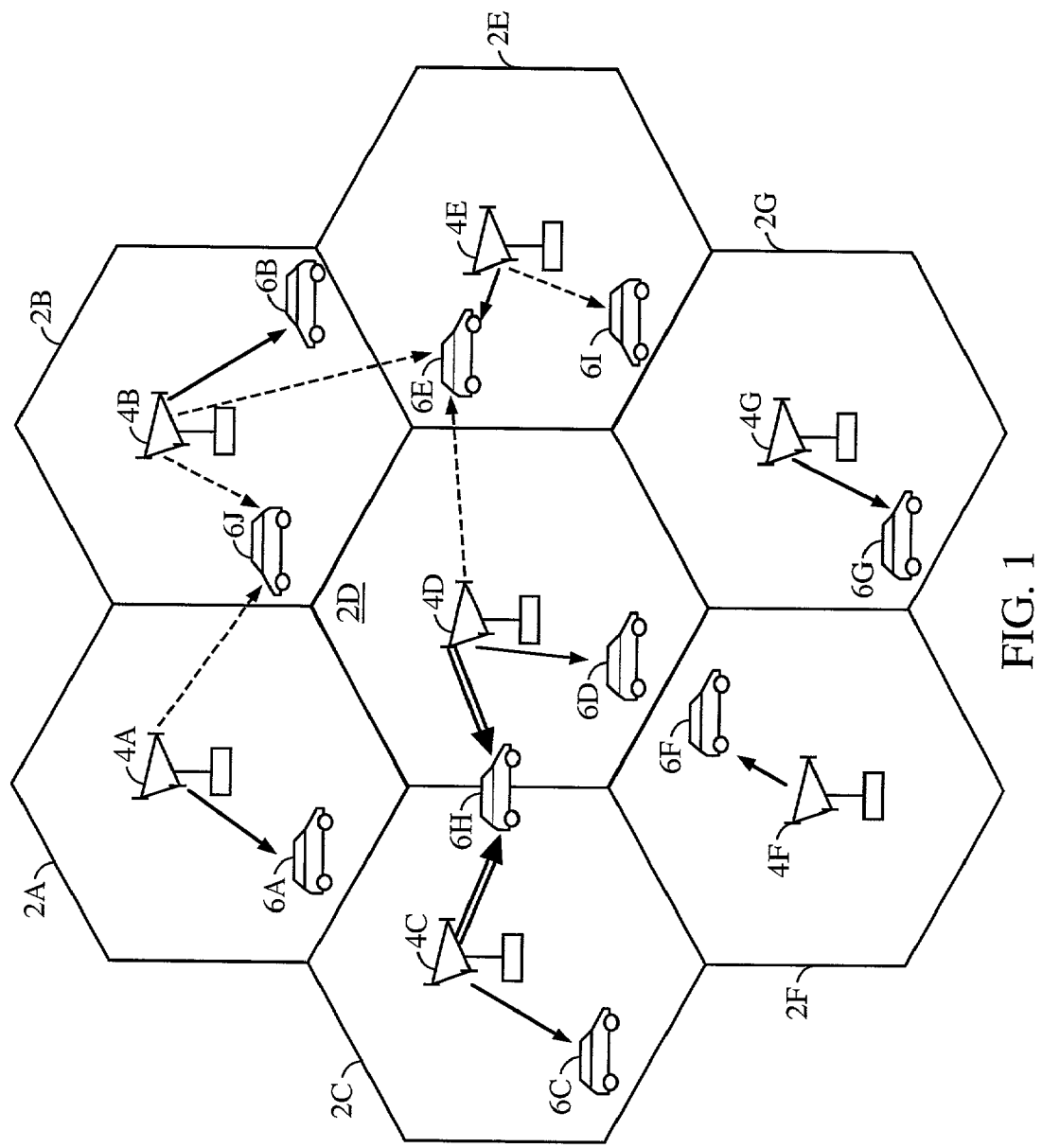
FIG. 1 represents an exemplary data communication system.

FIG. 1 represents the exemplary data communication system of the present invention. Each cell 2, denoted as 2a–2g, is serviced by a corresponding base station 4, denoted as 4a–4g, respectively. Various mobile stations 6 (denoted as 6a–6j) are dispersed throughout the data communication system. In the exemplary embodiment, each mobile station 6 can be in communication with one or more base stations 4 on the reverse link, depending on whether the mobile station 6 is in soft handoff. The reverse link communication is not shown in FIG. 1 for simplicity.

The term mobile station, as used throughout, includes any access terminal, such as a fixed wireless handset, handheld computers, unmanned data terminals, etc. The term base station, as used throughout, includes any access point. Commonly found in modern communications systems are sectorized base stations. Such a base station contains more than one sector, with each sector covering a unique portion of the cell (typically with some overlap). Methods for distinguishing one base station from another can be applied to distinguish one sector from another, even within the same cell. In CDMA systems, a unique pseudonoise covering sequence is used to distinguish each sector of each base station. As disclosed herein, there are some differences between sectors and base stations in the literal sense, and some of those differences will be exploited by the present invention, and specified in the following description. As such, unless otherwise specified, those skilled in the art will recognize when "base station", used throughout, can be interchanged with "sector of a base station" without departing from the scope of the present invention.

In HDR based systems, to increase system capacity, each base station 4 generally transmits to a single mobile station 6 with its entire power allotment, thus eliminating interference from multiple forward link transmissions in a cell. Multiple mobile stations 6 within a cell are served by time-sharing the base station's transmission resource. The minimum increment of time allocated to a particular mobile station 6 is known as a time slot. To further maximize capacity, each mobile station 6 generally communicates with at most one base station 4 on the forward link during each time slot, thus maintaining a ratio of one mobile station served per one base station. For example, base station 4a transmits data exclusively to mobile station 6a, base station 4b transmits data exclusively to mobile station 6b, and base station 4g transmits data exclusively to mobile station 6g on the forward link at time slot n. In FIG. 1, the solid line with the arrow indicates a data transmission from base station 4 to mobile station 6. A broken line with the arrow indicates that mobile station 6 is receiving the pilot signal, but no data transmission, from base station 4.

Mobile stations 6, especially those located near a cell boundary, can receive the pilot signals from multiple base stations 4. For example, mobile station 6j is capable of receiving signals from both base stations 4a and 4b, and mobile station 6e is capable of receiving signals from three base stations, 4b, 4d, and 4e. If the pilot signal is above a predetermined threshold, mobile station 6 can request that base station 4 be added to the active set of mobile station 6. In one embodiment of the present invention, a higher threshold is used to allow a new base station into the active set and a lower threshold is used to allow into the active set a new sector of a base station which is already in the active set. As described above, the forward link data will be delivered for queuing in the various base stations in the active set. In general, one sector of one base station 4 of those contained in the active set of a mobile station 6 may transmit on the forward link in any given time slot.

Under certain circumstances, however, it may be advantageous to allow more than one base station 4 to transmit to a mobile station 6 during a single time slot, i.e. soft handoff on the forward link. For example, consider mobile station 6h, which resides at the boundary of cells 2c and 2d. It may be that due to natural or man-made obstacles between mobile station 6h and base stations 4c and 4d, that the received C/I at mobile station 6h from either base station is insufficient to provide communication at an adequate GOS. Perhaps communication is possible, but only at the lower supported data rates. If mobile station 6h remains in this described location, its throughput will remain at a low level indefinitely. The result may be an unsatisfied mobile user experiencing undesirable quality or delay of the data service being utilized. Furthermore, a mobile network provider may wish to add revenue and/or distinguish itself from its competitors by offering contracted guarantee of service (GOS) or quality of service (QOS) levels, which may not be met under the circumstances of mobile station 6h just described. Alternatively, the GOS or QOS guarantee may be met by allocating a higher percentage of the available time slots from either base station 4c or 4d (albeit at a lower transfer rate).

Allowing soft handoff on the forward link in combination with diversity reception capabilities in the mobile station will permit higher rates of data transfer. This increased data rate can be achieved either by redundant transfers from the base stations or by transmit diversity of multiple streams. In some cases, system capacity may actually improve if GOS requirements are met using fewer time slots, made possible by forward link soft handoff. In this example, base stations 4c and 4d simultaneously transmit forward link data to mobile 6h during a single time slot, as indicated by double lines. In one embodiment, mobile stations 4c and 4d would both transmit exclusively to mobile station 6h during a time slot. In an alternative embodiment, base stations 4c and 4d may allocate a portion of their forward link power to simultaneously transfer to mobile station 6h, while transmitting to mobile stations 6c and 6d in the same time slot with the remainder of the power.

In addition to meeting GOS requirements or capacity constraints as just described, forward link soft handoff may be desirable when a system is not fully loaded. A mobile station, such as mobile station 6h, which is in a geographical area with limited maximum data rate, can be supplied with a higher throughput regardless of the minimum GOS for mobile station 6h when the neighboring cells are not fully loaded. In many instances when a system is not fully loaded, i.e., not every base station is transmitting at maximum power to a unique user in every time slot, then the possibility exists that overall throughput can be increased whenever any user in the system is receiving data at less than the maximum rate because of degraded C/I due to path loss. In these cases, forward link soft handoff may succeed in raising the data rate to that user with no loss in data rate to the other users. Thus the capacity of the system is increased.

Figure 2:
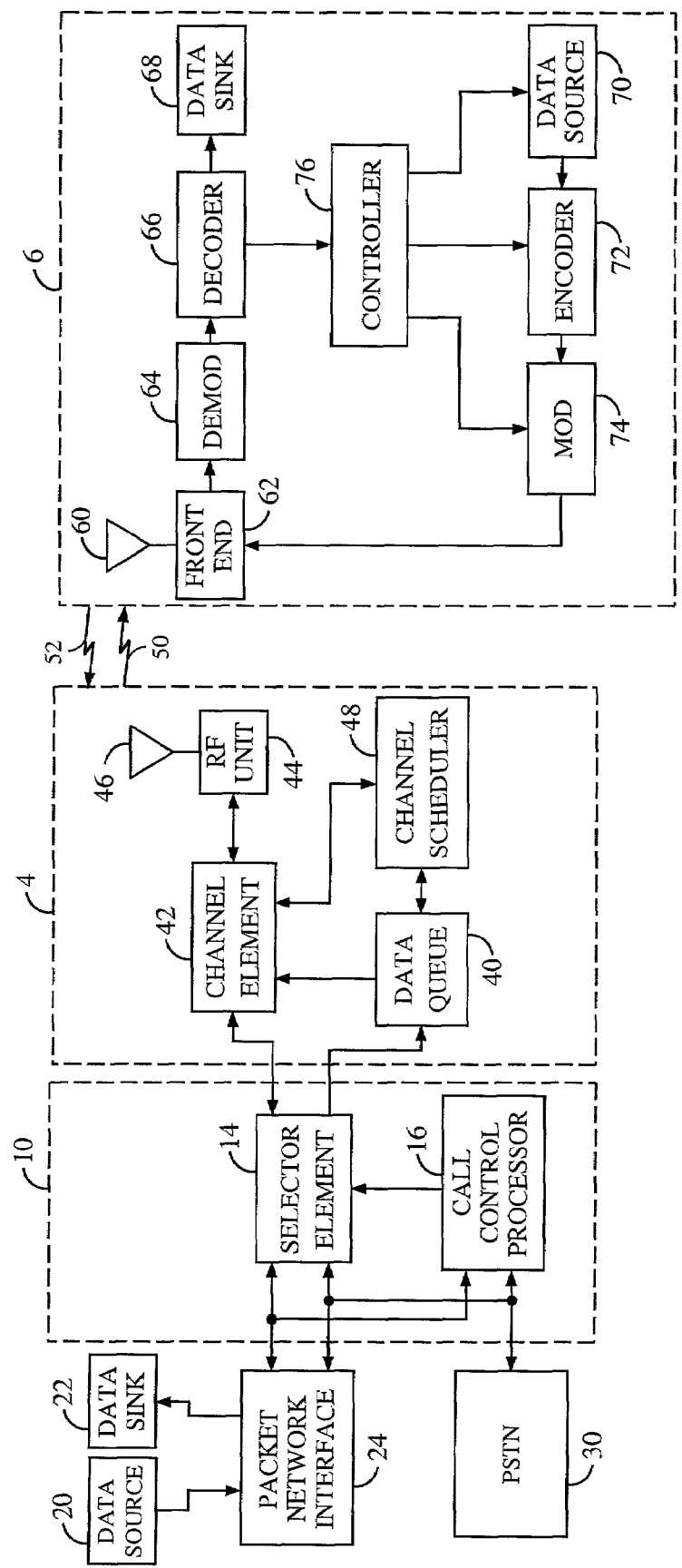
FIG. 2 is a block diagram illustrating the basic subsystems of an exemplary data communication system.

A block diagram illustrating the basic subsystems of the data communication system of the present invention is shown in FIG. 2. Base station controller 10 interfaces with packet network interface 24 (which may be one or more packet data service nodes, or PDSNs), Public Switched Telephone Network (PSTN) 30, and all base stations 4 in the data communication system (only one base station 4 is shown in FIG. 2 for simplicity). Base station controller 10 coordinates the communication between mobile stations 6 in the data communication system and other users connected to packet network interface 24 and PSTN 30. PSTN 30 interfaces with users through the standard telephone network (not shown in FIG. 2).

Base station controller 10 contains many selector elements 14, although only one is shown in FIG. 2 for simplicity. One selector element 14 is assigned to control the communication between one or more base stations 4 and one mobile station 6. To assign element 14 to mobile station 6, call control processor 16 is informed of the need to page mobile station 6. Call control processor 16 then directs base station 4 to page mobile station 6.

Data source 20 contains the data which is to be transmitted to mobile station 6. Data source 20 provides the data to packet network interface 24. Packet network interface 24 receives the data and routes the data to selector element 14. Selector element 14 sends the data to each base station 4 in communication with mobile station 6. This connection between base station controller 10 and all the base stations 4 is known as the backhaul network, referred to previously. Each base station 4 maintains data queue 40 which contains the data to be transmitted to mobile station 6.

In the exemplary embodiment, on the forward link, a data packet refers to a predetermined amount of data which is independent of the data rate. The data packet is formatted with other control and coding bits and encoded. If data transmission occurs over multiple Walsh channels, the encoded packet is demultiplexed into parallel streams, with each stream transmitted over one Walsh channel.

The data is sent, in data packets, from data queue 40 to channel element 42. For each data packet, channel element 42 inserts the necessary control fields. The data packet, control fields, frame check sequence bits, and code tail bits comprise a formatted packet. Channel element 42 then encodes one or more formatted packets and interleaves (or reorders) the symbols within the encoded packets. Next, the interleaved packet is scrambled with a scrambling sequence, covered with Walsh covers, and spread with the long PN code and the short PNI and PNQ codes. The spread data is quadrature modulated, filtered, and amplified by a transmitter within RF unit 44. The forward link signal is transmitted over the air through antenna 46 on forward link 50.

As described above, base station 4 commonly contains multiple sectors, not shown. It will be clear to those skilled in the art that transmission on any sector of a base station can utilize data queue 40, and thus the addition of a sector of a base station 4 to an active set already containing a sector from that base station 4 will not require additional signaling and data transfer on the backhaul network (the connection between base station controller 10 and the various base stations 4).

At mobile station 6, the forward link signal is received by antenna 60 and routed to a receiver within front end 62. The receiver filters, amplifies, quadrature demodulates, and quantizes the signal. The digitized signal is provided to demodulator (DEMOD) 64 where it is despread with the long PN code and the short PNI and PNQ codes, decovered with the Walsh covers, and descrambled with the identical scrambling sequence. The demodulated data is provided to decoder 66 which performs the inverse of the signal processing functions done at base station 4, specifically the de-interleaving, decoding, and frame check functions. The decoded data is provided to data sink 68. The hardware, as described above, supports transmissions of data, messaging, voice, video, and other communications over the forward link.

The system control and scheduling functions can be accomplished through many implementations. The location of channel scheduler 48 is dependent on whether a centralized or distributed control/scheduling processing is desired. For example, for distributed processing, channel scheduler 48 can be located within each base station 4. Conversely, for centralized processing, channel scheduler 48 can be located within base station controller 10 and can be designed to coordinate the data transmissions of multiple base stations 4. Other implementations of the functions described herein can be contemplated and are within the scope of the present invention.

As shown in FIG. 1, mobile stations 6 are dispersed throughout the data communication system and can be in communication with zero or one base station 4 on the forward link, or more than one base station 4 if soft handoff is desired. In the exemplary embodiment, channel scheduler 48 coordinates the forward link data transmissions of one base station 4. In the exemplary embodiment, channel scheduler 48 connects to data queue 40 and channel element 42 within base station 4 and receives the queue size, which is indicative of the amount of data to transmit to mobile station 6, and the data request channel (DRC) messages from mobile stations 6. Channel scheduler 48 schedules high rate data transmission such that the system goals of maximum data throughput and minimum transmission delay are optimized.

In the exemplary embodiment, the data transmission is scheduled based in part on the quality of the communication link. An exemplary communication system which selects the transmission rate based on the link quality is disclosed in U.S. patent application Ser. No. 08/741,320, entitled "METHOD AND APPARATUS FOR PROVIDING HIGH SPEED DATA COMMUNICATIONS IN A CELLULAR ENVIRONMENT", filed Sep. 11, 1996, assigned to the assignee of the present invention and incorporated by reference herein. In the present invention, the scheduling of the data communication can be based on additional considerations such as the GOS of the user, the queue size, the type of data, the amount of delay already experienced, and the error rate of the data transmission. These considerations are described in detail in U.S. Pat. No. 6,335,922, entitled "METHOD AND APPARATUS FOR FORWARD LINK RATE SCHEDULING", issued Jan. 1, 2002, and U.S. Pat. No. 5,923,650, entitled "METHOD AND APPARATUS FOR REVERSE LINK RATE SCHEDULING", both are assigned to the assignee of the present invention and incorporated by reference herein. Other factors can be considered in scheduling data transmissions and are within the scope of the present invention.

The data communication system of the present invention supports data and message transmissions on the reverse link. Within mobile station 6, controller 76 processes the data or message transmission by routing the data or message to encoder 72. Controller 76 can be implemented in a microcontroller, a microprocessor, a digital signal processing (DSP) chip, or an ASIC programmed to perform the function as described herein.

In the exemplary embodiment, encoder 72 encodes the message consistent with the Blank and Burst signaling data format described in the aforementioned U.S. Pat. No. 5,504,773. Encoder 72 then generates and appends a set of CRC bits, appends a set of code tail bits, encodes the data and appended bits, and reorders the symbols within the encoded data. The interleaved data is provided to modulator (MOD) 74.

Modulator 74 can be implemented in many embodiments. In the exemplary embodiment, the interleaved data is covered with Walsh codes, spread with a long PN code, and further spread with the short PN codes. The spread data is provided to a transmitter within front end 62. The transmitter modulates, filters, amplifies, and transmits the reverse link signal over the air, through antenna 46, on reverse link 52.

In the exemplary embodiment, mobile station 6 spreads the reverse link data in accordance with a long PN code. Each reverse link channel is defined in accordance with the temporal offset of a common long PN sequence. At two differing offsets the resulting modulation sequences are uncorrelated. The offset of a mobile station 6 is determined in accordance with a unique numerical identification of mobile station 6, which in the exemplary embodiment of the IS-95 mobile stations 6 is the mobile station specific identification number. Thus, each mobile station 6 transmits on one uncorrelated reverse link channel determined in accordance with its unique electronic serial number. In an alternative embodiment, reverse link channels may be defined using unique, uncorrelated codes, other than those generated as offsets from a common PN code.

At base station 4, the reverse link signal is received by antenna 46 and provided to RF unit 44. RF unit 44 filters, amplifies, demodulates, and quantizes the signal and provides the digitized signal to channel element 42. Channel element 42 despreads the digitized signal with the short PN codes and the long PN code. Channel element 42 also performs the Walsh code decovering and pilot and DRC extraction. Channel element 42 then reorders the demodulated data, decodes the de-interleaved data, and performs the CRC check function. The decoded data, e.g. the data or message, is provided to selector element 14. Selector element 14 routes the data and message to the appropriate destination. Channel element 42 may also forward a quality indicator to selector element 14 indicative of the condition of the received data packet.

As described above, in the present invention, mobile station 6 can be in communication with one or more base stations 4 simultaneously. The actions taken by mobile station 6 depend on whether mobile station 6 is or is not in soft handoff. These two cases are discussed separately below.

Consider first the case where mobile station 6 is not in soft handoff, i.e., it communicates with only one base station 4. Referring to FIG. 2, the data destined for a particular mobile station 6 is provided to selector element 14 which has been assigned to control the communication with that mobile station 6. Selector element 14 forwards the data to data queue 40 within base station 4. Base station 4 queues the data and transmits a paging message on the control channel. Base station 4 then monitors the reverse link DRC channel for DRC messages from mobile station 6. If no signal is detected on the DRC channel, base station 4 can retransmit the paging message until the DRC message is detected. After a predetermined number of retransmission attempts, base station 4 can terminate the process or re-initiate a call with mobile station 6.

In the exemplary embodiment, mobile station 6 transmits the requested data rate, in the form of a DRC message, to base station 4 on the DRC channel. In the alternative embodiment, mobile station 6 transmits an indication of the quality of the forward link channel (e.g., the C/I measurement) to base station 4. In the exemplary embodiment, the DRC message is transmitted within the first half of each time slot. Base station 4 then has the remaining half of the time slot to decode the DRC message and configure the hardware for data transmission at the next successive time slot, if that time slot is available for data transmission to this mobile station 6. If the next successive time slot is not available, base station 4 waits for the next available time slot and continues to monitor the DRC channel for new DRC messages.

In the first embodiment, base station 4 transmits at the requested data rate. This embodiment confers to mobile station 6 the important decision of selecting the data rate. Always transmitting at the requested data rate has the advantage that mobile station 6 knows which data rate to expect. Thus, mobile station 6 only demodulates and decodes the traffic channel in accordance with the requested data rate. Base station 4 does not have to transmit a message to mobile station 6 indicating which data rate is being used by base station 4.

In the first embodiment, after reception of the paging message, mobile station 6 continuously attempts to demodulate the data at the requested data rate. Mobile station 6 demodulates the forward traffic channel and provides the soft decision symbols to the decoder. The decoder decodes the symbols and performs the frame check on the decoded packet to determine whether the packet was received correctly. If the packet was received in error or if the packet was directed for another mobile station 6, the frame check would indicate a packet error. Alternatively in the first embodiment, mobile station 6 demodulates the data on a slot by slot basis. In the exemplary embodiment, mobile station 6 is able to determine whether a data transmission is directed for it based on a preamble which is incorporated within each transmitted data packet, as described below. Thus, mobile station 6 can terminate the decoding process if it is determined that the transmission is directed for another mobile station 6. In either case, mobile station 6 transmits a negative acknowledgments (NACK) message to base station 4 to acknowledge the incorrect reception of the data units. Upon receipt of the NACK message, the data units received in error is retransmitted.

The transmission of the NACK messages can be implemented in a manner similar to the transmission of the error indicator bit (EIB) in the CDMA system. The implementation and use of EIB transmission are disclosed in U.S. Pat. No. 5,568,483, entitled "METHOD AND APPARATUS FOR THE FORMATTING OF DATA FOR TRANSMISSION", assigned to the assignee of the present invention and incorporated by reference herein. Alternatively, NACK can be transmitted with messages.

In the second embodiment, the data rate is determined by base station 4 with input from mobile station 6. Mobile station 6 performs the C/I measurement and transmits an indication of the link quality (e.g., the C/I measurement) to base station 4. Base station 4 can adjust the requested data rate based on the resources available to base station 4, such as the queue size and the available transmit power. The adjusted data rate can be transmitted to mobile station 6 prior to or concurrent with data transmission at the adjusted data rate, or can be implied in the encoding of the data packets. In the first case, wherein mobile station 6 receives the adjusted data rate before the data transmission, mobile station 6 demodulates and decodes the received packet in the manner described in the first embodiment. In the second case, wherein the adjusted data rate is transmitted to mobile station 6 concurrent with the data transmission, mobile station 6 can demodulate the forward traffic channel and store the demodulated data. Upon receipt of the adjusted data rate, mobile station 6 decodes the data in accordance with the adjusted data rate. And in the third case, wherein the adjusted data rate is implied in the encoded data packets, mobile station 6 demodulates and decodes all candidate rates and determine aposteriori the transmit rate for selection of the decoded data. The method and apparatus for performing rate determination are described in detail in U.S. Pat. No. 5,751,725, entitled "METHOD AND APPARATUS FOR DETERMINING THE RATE OF RECEIVED DATA IN A VARIABLE RATE COMMUNICATION SYSTEM", and U.S. Pat. No. 6,175,590, also entitled "METHOD AND APPARATUS FOR DETERMINING THE RATE OF RECEIVED DATA IN A VARIABLE RATE COMMUNICATION SYSTEM", both assigned to the assignee of the present invention and incorporated by reference herein. For all cases described above, mobile station 6 transmits a NACK message as described above if the outcome of the frame check is negative.

The discussion hereinafter is based on the first embodiment wherein mobile station 6 transmits to base station 4 the DRC message indicative of the requested data rate, except as otherwise indicated. However, the inventive concept described herein is equally applicable to the second embodiment wherein mobile station 6 transmits an indication of the link quality to base station 4.

Now consider the second case, where mobile station 6 is in soft handoff, i.e., it communicates with multiple base stations 4. As described above, under certain circumstances, for capacity considerations, a mobile station 6 may only receive data on the forward link from a single base station 4, even when it is in soft handoff. Nevertheless, as described above, under certain conditions, GOS and/or capacity considerations may dictate that soft handoff on the forward link is in order. On the reverse link, more than one base station 4 can receive, demodulate, and combine data from one mobile station 6 without compromising capacity, since the mobile station 6 will be transmitting from wherever it is located regardless of how many base stations 4 are monitoring its transmission. In fact, using soft handoff on the reverse link is more likely to increase reverse link capacity since mobile station 6 may be able to transmit at a lower power level (hence reducing interference and increasing capacity) when multiple base stations receive and combine the reverse link signal.

There are a variety of techniques for determining when forward link soft handoff should be employed instead of armed handoff. In one embodiment, the mobile station monitors the received C/I values from the available base stations and delivers a DRC request for forward link soft handoff when it is deemed appropriate. This may be determined in conjunction with statistical data of past received C/I values data rates, as well as GOS requirements. GOS, as described above, may include a minimum standard for all users. In addition, some users may contract for higher GOS requirements than the minimum standard. Service may be measured in terms of minimum transfer rate during any one time slot, average throughput over some specified time interval, received C/I, or other statistical measurements of received C/I, data rates, and/or throughput. Whatever the definition of GOS, a particular mobile station 6 may determine that current conditions warrant a request for forward link data to be transmitted from more than one base station in a single time slot. Based on received C/I from the available base stations (including combinations thereof), the mobile can indicate which active set candidates should be included in forward link soft handoff transmission.

In alternative embodiments, base stations 4 or base station controller 10 can determine when soft handoff may be appropriate. In one embodiment, just as base station 4 can be used to determine forward link data rates based on link quality measurements supplied by the mobile station (described above), the same link quality measurements, in conjunction with past link quality measurements and/or previously supplied data rates can be used to determine if the proper GOS is being provided. If not, forward link soft handoff may be in order. In another embodiment, base station 4 can determine based upon the current requested data rate on the DRC in conjunction with the prior delivered transmission rates that soft handoff may be in order. In yet another alternative, base station controller 10 determines when forward link soft handoff should be employed, based on overall capacity optimization, and in conjunction with either the base station or mobile station measurements just described.

The determination that forward link soft handoff should be initiated can be made using a variety of methods. First, whenever the best received C/I from a single base station is below a threshold, then soft handoff can be requested whenever soft handoff will increase the received C/I above that threshold. This may be limited to two-way soft handoff, or it can allow any number of base stations and/or sectors in the handoff. Second, soft handoff requests can be limited to situations where initiating it will increase the C/I sufficiently that one of a subset of higher data rates can be supported. For example, in some systems a discrete number of data rates are available which can be requested on the DRC based on receive C/I. If the improvement yielded by soft handoff is not sufficient to allow a higher data rate, then there will not be an advantage to offset the capacity degradation that may occur. Similarly, soft handoff may be limited to cases where more than one incremental data rate improvement can be achieved. Third, system loading can be factored into the decision. Under different loading conditions, the required marginal improvement in received C/I or data rate can be adjusted to be more or less liberal in allowing forward link soft handoff requests. This third method can be employed in the base station controller as described, or within a mobile station 6 with an appropriate message indicating current loading levels in the system (or for more precision, in the active set and/or neighbor set for a given mobile station 6).

Mobile station 6 can simultaneously receive the pilot signals from multiple base stations 4. If the C/I measurement of a base station 4 is above a predetermined threshold, the base station 4 can be added to the active set of mobile station 6. As described above, the threshold for adding a base station to the active set may be higher for a base station not already represented in the active set. In consideration of backhaul network congestion and data queue 40 maintenance, a lower threshold may be used when adding an additional sector from a base station 4 to an active set already containing at least one sector from that base station.

Naturally, neither of the thresholds just described need to be fixed thresholds. As described in the '502 patent, an alternative technique for adding a base station or sector is to calculate the marginal improvement in received C/I should the sector or base station be added to the active set. To illustrate, if the active set contains only a single base station whose received C/I is very strong, then the discovery of another very strong signal from a new base station may fail to qualify that base station for inclusion in the active set because the relative improvement in received C/I would be quite small. In contrast, a mobile station which has several weak base stations as measured by received C/I in its active set may readily accept a newly discovered base station received with medium strength into its active set because, while the new signal was only of medium strength, the relative improvement in received C/I may exceed the required marginal threshold for inclusion.

Referring to FIG. 2, selector element 14 assigned to control the communication with mobile station 6 forwards the data to all base stations 4 in the active set of mobile station 6. All base stations 4 which receive data from selector element 14 transmit a paging message to mobile station 6 on their respective control channels. In response, mobile station 6 performs two functions. First, mobile station 6 selects the best base station 4 based on a set of parameters which can include the best C/I measurement. Mobile station 6 then selects a data rate corresponding to the C/I measurement and transmits a DRC message to the selected base station 4. Alternatively, if the conditions warrant, mobile station 6 can determine that soft handoff is in order and which base stations should be included (using techniques described above). Mobile station 6 can direct transmission of the DRC message to a particular base station 4 by covering the DRC message with the Walsh cover assigned to that particular base station 4. Second, mobile station 6 attempts to demodulate the forward link signal in accordance with the requested data rate at each subsequent time slot. Soft handoff requests in a DRC message directed to a particular base station 4 can be passed on to base station controller 10 for soft handoff initiation.

After transmitting the paging messages, all base stations 4 in the active set monitor the DRC channel for a DRC message from mobile station 6. Again, because the DRC message is covered with a Walsh code, the selected base station 4 assigned with the identical Walsh cover is able to decover the DRC message. Upon receipt of the DRC message, the selected base station 4 transmits data to mobile station 6 at the next available time slots.

In the exemplary embodiment, base station 4 transmits data in packets comprising a plurality of data units at the requested data rate to mobile station 6. If the data units are incorrectly received by mobile station 6, a NACK message is transmitted on the reverse links to all base stations 4 in the active set. In the exemplary embodiment, the NACK message is demodulated and decoded by base stations 4 and forwarded to selector element 14 for processing. Upon processing of the NACK message, the data units are retransmitted using the procedure as described above. In the exemplary embodiment, selector element 14 combines the NACK signals received from all base stations 4 into one NACK message and sends the NACK message to all base stations 4 in the active set.

In the exemplary embodiment, mobile station 6 can detect changes in the best C/I measurement and dynamically request data transmissions from different base stations 4 at each time slot to improve efficiency. When armed handoff is being utilized, data transmission occurs from only one base station 4 at any given time slot, so other base stations 4 in the active set may not be aware which data units, if any, has been transmitted to mobile station 6. In the exemplary embodiment, the transmitting base station 4 informs selector element 14 of the data transmission. Selector element 14 then sends a message to all base stations 4 in the active set. In the exemplary embodiment, the transmitted data is presumed to have been correctly received by mobile station 6. Therefore, if mobile station 6 requests data transmission from a different base station 4 in the active set, the new base station 4 transmits the remaining data units. In the exemplary embodiment, the new base station 4 transmits in accordance with the last transmission update from selector element 14. Alternatively, the new base station 4 selects the next data units to transmit using predictive schemes based on metrics such as the average transmission rate and prior updates from selector element 14. These mechanisms minimize duplicative retransmissions of the same data units by multiple base stations 4 at different time slots thus mitigating efficiency losses. When unique sequence numbers are assigned to data units, base stations 4 can retransmit data units received in error out of sequence. In the exemplary embodiment, if a hole (or non-transmitted data units) is created (e.g., as the result of handoff between one base station 4 to another base station 4), the missing data units are considered as though received in error. Mobile station 6 transmits NACK messages corresponding to the missing data units and these data units are retransmitted.

In the exemplary embodiment, each base station 4 in the active set maintains an independent data queue 40 which contains the data to be transmitted to mobile station 6. The selected base station 4 transmits data existing in its data queue 40 in a sequential order, except for retransmissions of data units received in error and signaling messages. In the exemplary embodiment, the transmitted data units are deleted from queue 40 after transmission.

Figure 3:
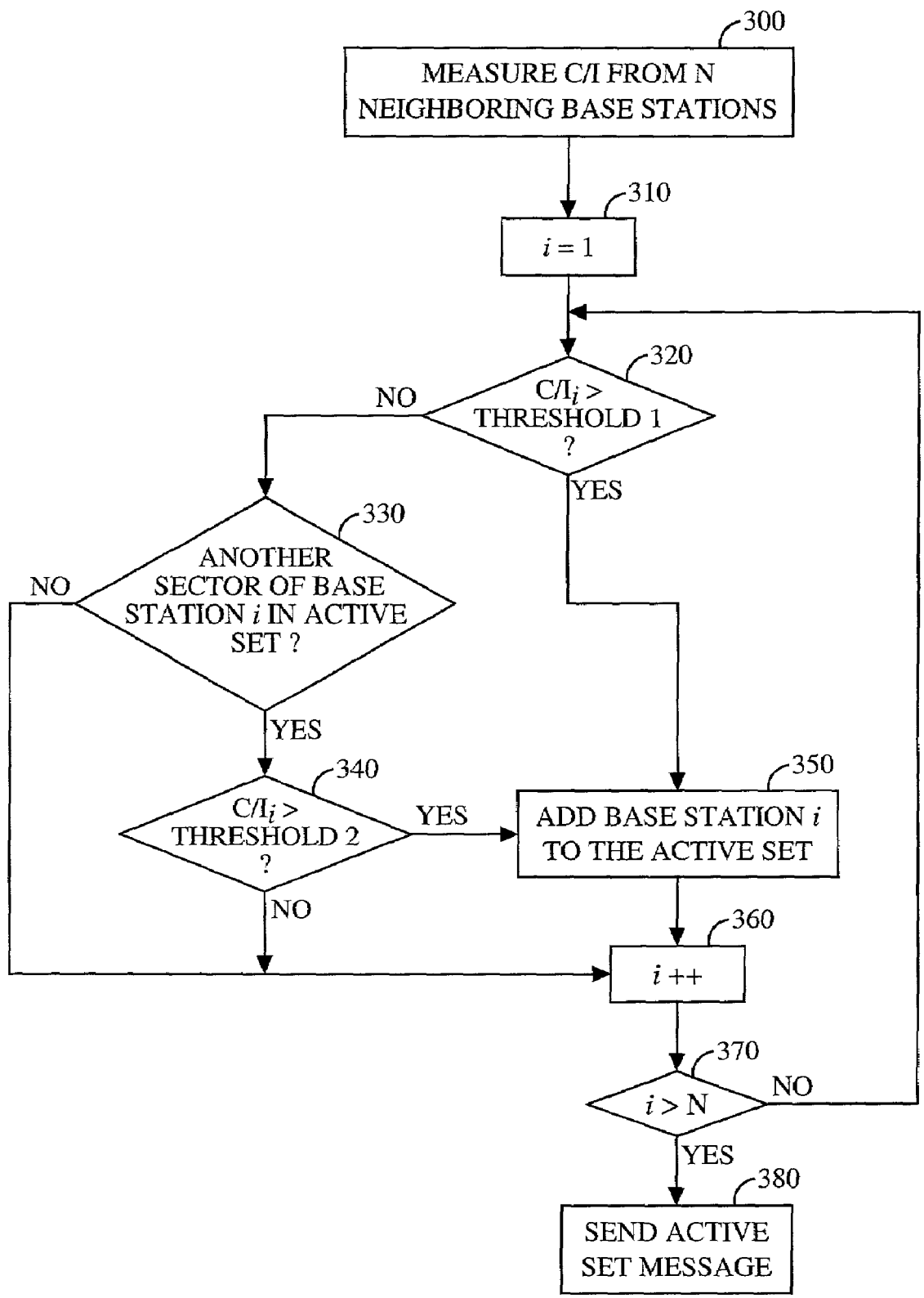
FIG. 3 is a flow diagram depicting the steps to add one or more base stations to an active set.

FIG. 3 is a flow diagram depicting the steps to add one or more base stations to the active set according to the exemplary embodiment. In block 300, the signal quality, such as C/I, received at the mobile station is measured for each of the available base stations. The set of available base stations to search, sometimes called the neighbor and candidate sets, can be delivered to the mobile station from one or more base stations, or may consist of base stations searched out by the mobile station. Assume there are N candidate base stations. Each will be tested for inclusion in the active set, in a loop which is initialized by setting i=1 in block 310.

The C/I received at the mobile station from the $i_{th}$ base station ($C/I_i$), is compared in decision block 320 with a first threshold, Threshold 1. If $C/I_i$ exceeds Threshold 1, then base station i is added to the active set in block 350. The flow then proceeds to block 360 to determine if additional candidates need to be tested. If $C/I_i$ does not exceed Threshold 1, then proceed to decision block 330 to determine if another sector of base station i is already included in the active set. If so, then $C/I_i$ is compared in decision block 340 with a second (typically lower) threshold, Threshold 2. If the second threshold is exceeded, then proceed to block 350 to add base station i to the active set. As described above, adding additional sectors to the active set whose base stations are already represented in the active set is less demanding in terms of queue maintenance and backhaul network traffic, and so a lower threshold for these sectors may be appropriate. If, in decision block 330, there is not another sector of base station i already in the active set, or if, in decision block 340, Threshold 2 is not exceeded, then proceed to block 360.

In block 360, i is incremented by one, and if i>N in decision block 370 then the entire set of candidates has been tested and the flow proceeds to block 380. If i is less than or equal to N, then additional candidates remain to be tested, and the loop is repeated by proceeding to block 320, described above. In block 380, a message is delivered to one or more base stations and to a base station controller which indicates the new status of the active set. Various methods are known for creating and transmitting such a message.

Note that for both Threshold 1 and Threshold 2, any number of threshold determining procedures will apply. For example, a simple static threshold can be determined for both. Or, relatively static thresholds can be determined in response to system variables, such as overall loading, or the relative GOS of the mobile station in question. As described above, a threshold may be calculated for each new candidate such that the incremental benefit of adding that candidate exceeds some incremental advantage threshold. Various procedures for determining thresholds can be contemplated and are within the scope of the present invention.

Figure 4:
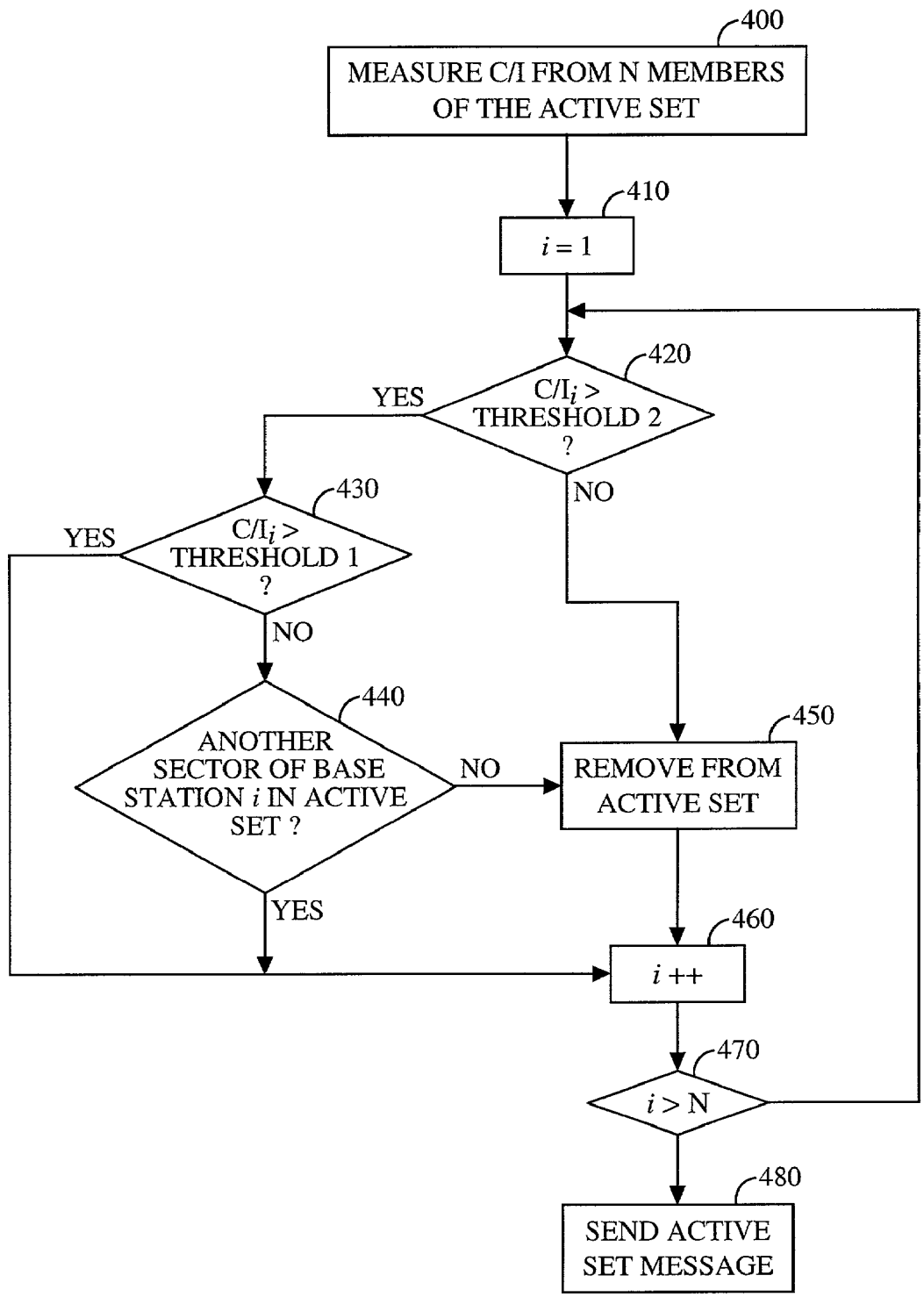
FIG. 4 is a flow diagram depicting the steps to remove one or more base stations from an active set.

FIG. 4 is a flow diagram depicting the steps to remove one or more base stations from the active set according to the exemplary embodiment. It is similar to the process for adding base stations described above with reference to FIG. 3. In block 400, the signal quality, such as C/I, received at the mobile station is measured for each of the base stations in the active set. Assume the active set contains N base stations. Each will be tested to see if it should remain in the active set, in a loop which is initialized by setting i=1 in block 410.

The C/I received at the mobile station from the $i_{th}$ base station ($C/I_i$), is compared in decision block 420 with a second threshold, Threshold 2. If $C/I_i$ does not exceed Threshold 2, then base station i is removed from the active set in block 450. The flow then proceeds to block 460 to determine if additional candidates need to be tested. If $C/I_i$ exceeds Threshold 2, then proceed to decision block 430, where $C/I_i$ is compared with a first threshold (typically higher than the second), Threshold 1. If Threshold 1 is not exceeded, proceed to decision block 440 to determine if another sector of base station i is already included in the active set. If not, then proceed to block 450 to remove base station i from the active set. If, in decision block 430, Threshold 1 is exceeded, or if, in decision block 440, there is another sector of base station i already in the active set, then base station i does not warrant removal from the active set. Proceed to block 460. (Note that it may be desirable to add an additional step, not shown, to ensure that two base station sectors don't perpetually remain in the active set when neither one of them exceeds the first, higher threshold.)

In block 460, i is incremented by one, and if i>N in decision block 470 then the entire set of candidates has been tested and the flow proceeds to block 480. If i is less than or equal to N, then additional candidates remain to be tested, and the loop is repeated by proceeding to block 420, described above. In block 480, a message is delivered to one or more base stations and to a base station controller which indicates the new status of the active set. Various methods are known for creating and transmitting such a message.

Note that Threshold 1 and Threshold 2, as described in relation to FIG. 4, may be the same as the corresponding thresholds described in relation to FIG. 3. However, this is not necessary—the removal thresholds can be different than the add thresholds. The various techniques for determining thresholds, described above with relation to FIG. 3, hold for the thresholds described in FIG. 4 as well.

Figure 5:
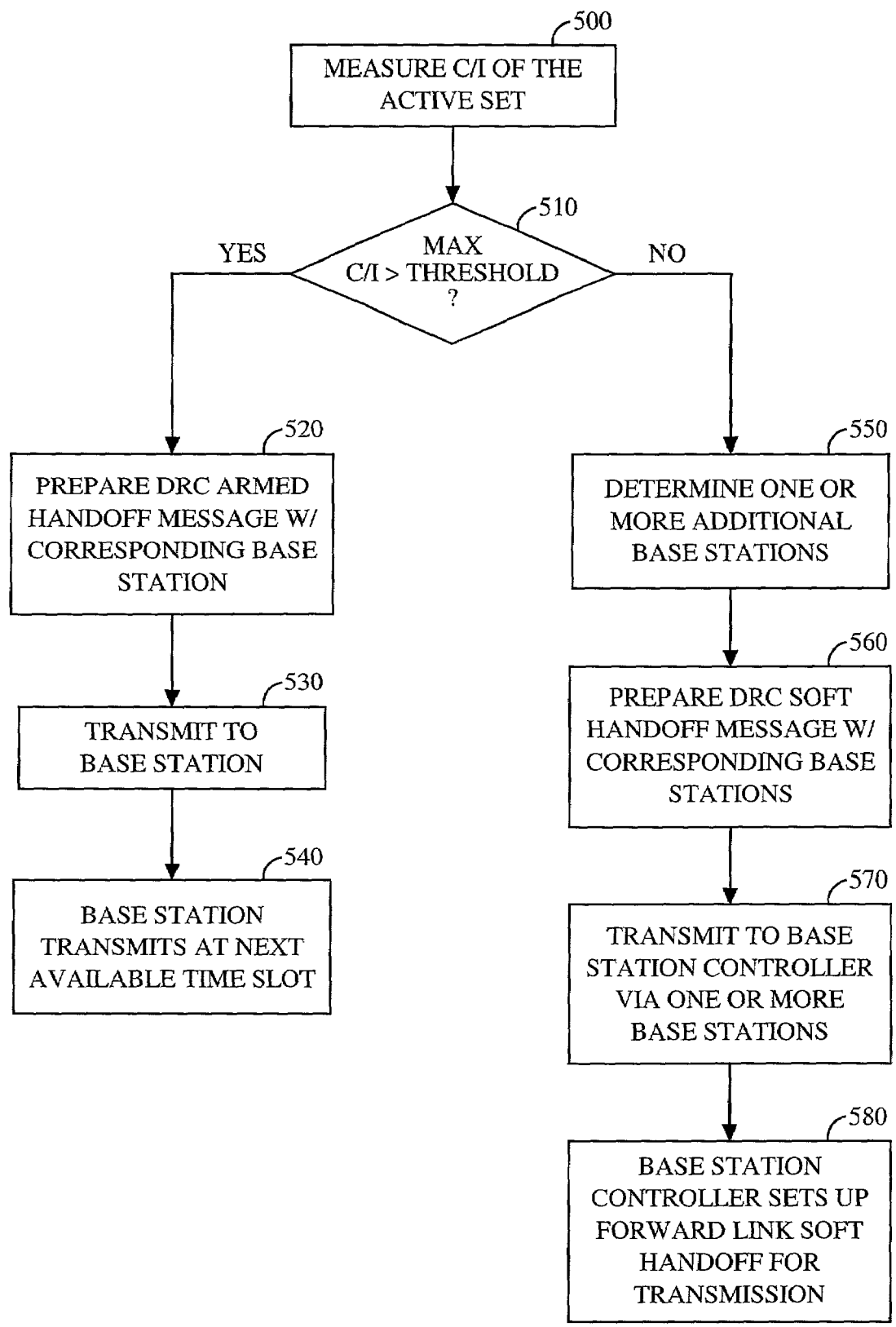
FIG. 5 is a flow chart depicting the steps to employ multiple handoff criteria in the exemplary embodiment.

FIG. 5 is a flow chart depicting the steps to employ multiple handoff criteria according to the exemplary embodiment. In block 500, the received C/I from each base station in the active set is measured at the mobile station. In decision block 510, the greatest C/I is compared with a threshold. As described above, other forward link quality measurements can be substituted for C/I. Various methods for determining this threshold have been disclosed above. For example, a minimum threshold may be set such that a corresponding minimum data rate is supportable given that C/I measurement. The threshold may be set differently in different mobile stations, if different GOS requirements exist between them. The threshold may be altered depending on the average throughput received by the mobile station in the past. E.g., a lower C/I and hence a lower data rate may be acceptable to a given mobile station for a period of time, but may need to be raised if the average throughput turns out not to be acceptable for the given GOS.

If, in decision block 510, the maximum C/I is above the threshold, then armed handoff can be carried out. Only a single base station, that with the maximum C/I is required to deliver an acceptable data rate. In block 520 a DRC message for armed handoff is prepared, identifying that base station. The message may also identify the desired data rate, or in the alternative give a measure of forward link quality, as discussed above. The message is transmitted to the base station in block 530, and can be directed specifically to that base station using Walsh covering techniques described above. The base station receives the message, block 540, and transmits to the mobile station at the next available time slot. Note that the base station is likely to continue monitoring DRC messages from the mobile in case the mobile's environment changes.

If, in decision block 510, the maximum C/I does not exceed the threshold, then forward link soft handoff is required to achieve that C/I threshold. In block 550, one or more additional base stations are identified whose combined delivered C/I exceeds the minimum threshold. If the active set base stations are sorted in order of decreasing received C/I, then one method is the process of testing the combined C/I of sequentially added base stations until the threshold is achieved. Various other methods can be contemplated and are within the scope of the present invention.

In block 560, a DRC message for soft handoff, including the associated base stations is prepared. In block 570, the message is delivered via one or more base stations to the base station controller. In block 580, the base station controller sets up the forward link in soft handoff for transmission to the mobile at the next available time slot.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for high speed data transmission from one or more base stations to a mobile station comprising:
   measuring the quality of forward link signals from one or more base stations;
   adding one or more base stations to an active set when the quality of the forward link signal from the base station exceeds a higher threshold;
   adding one or more sectors of one or more base stations to an active set when the quality of the forward link signal from each sector exceeds a lower threshold and at least one other sector of that sector's base station is in the active set; and
   transmitting from one base station having the highest measured forward link signal quality to the mobile station during a time slot when that measured forward link signal quality meets certain criteria; and
   transmitting from one or more base stations in soft handoff to the mobile station during a time slot when the highest measured forward link signal quality does not meet certain criteria.

2. The method of claim 1 wherein the quality of each forward link signal is determined by the received signal-to-noise-and-interference ratio (C/I).

3. The method of claim 2 wherein the criteria includes a minimum C/I corresponding to a minimum data rate.

4. The method of claim 2 wherein the criteria includes a guarantee of service requiring a minimum C/I.

5. The method of claim 3 wherein the criteria further includes a measure of system loading.

6. The method of claim 1 wherein the quality of each forward link signal is determined by the sustainable data rate.

7. The method of claim 6 wherein the criteria includes a minimum data rate.

8. The method of claim 6 wherein the criteria includes a guarantee of service requiring a minimum data rate.

9. The method of claim 6 wherein the criteria includes a statistical measure of data throughput.

10. The method of claim 9 wherein the statistical measure of data throughput is average throughput over a certain time duration.

11. The method of claim 7 wherein the criteria further includes a measure of system loading.

12. A method for high speed data transmission from one or more sectored base stations to a mobile station comprising:
    measuring the quality of forward link signals from one or more sectors of one or more base stations;
    adding one or more of the sectors of one or more base stations to an active set when the quality of the forward link signal from each sector exceeds a higher threshold; and
    adding one or more of the sectors of one or more base stations to an active set when the quality of the forward link signal from each sector exceeds a lower threshold and at least one other sector of that sector's base station is in the active set.

13. The method of claim 12 further comprising:
    transmitting from the sector having the highest measured forward link signal quality to the mobile station during a time slot when that measured forward link signal quality meets certain criteria; and
    transmitting from one or more sectors in soft handoff to the mobile station during a time slot when the highest measured forward link signal quality does not meet certain criteria.

14. The method of claim 12 wherein the higher threshold is determined by adding a minimum marginal improvement factor to the quality of forward link signals from the sectors currently in the active set.

15. The method of claim 12 wherein the lower threshold is determined by adding a minimum marginal improvement factor to the quality of forward link signals from the sectors currently in the active set.

16. The method of claim 12 further comprising removing a sector from the active set when the forward link signal from that sector falls below a removal threshold.

17. The method of claim 16 wherein the removal threshold is the lower threshold when more than one sector from one base station are in the active, set and the removal threshold is the higher threshold when the sector is the only sector of its base station in the active set.

18. A method for high speed data transmission from one or more base stations to a mobile station comprising:
    measuring the quality of forward link signals from one or more base stations;
    selecting one base station according to the measured quality of forward link signals from one or more base stations;
    when the measured quality of the forward link signal from the selected base station meets a criterion, where the criterion consists of adding one or more base stations to an active set when the quality of the forward link signal from the base station exceeds a higher threshold;
    adding one or more sectors of one or more base stations to an active set when the quality of the forward link signal from each sector exceeds a lower threshold and at least one other sector of that sector's base station is in the active set; and:
    sending a data request message to the selected base station; and
    transmitting data from the selected base station to the mobile station at a rate in accordance with the measured quality of the forward link signal from the selected base station; and
    when the measured quality of the forward link signal from the selected base station does not meet a criterion:
      selecting one or more additional base stations such that the combined quality of forward link signals of the first selected base station and the additional one or more base stations meets the criterion; and
      transmitting data from the selected base station and the additional one or more base stations to the mobile station at a rate in accordance with the combined quality of the forward link signal from the selected and additional base stations.

19. The method of claim 18 wherein the quality of each forward link signal is determined by the received signal-to-noise-and-interference ratio (G/I).

20. The method of claim 19 wherein the criterion is a G/I corresponding to a minimum sustainable data rate.

21. A communications system, comprising:
a plurality of base stations which transmit respective pilots and respective code channels comprising a forward traffic channel;
a mobile station which has the plurality of base stations assigned to an active set thereof, comprising:
   a diversity receiver which measures respective signal qualities of the pilots;
   a processor which produces a signal quality standard, prepares a message directing one of the base stations to transmit data on its respective fox-ward traffic channel when the quality of the pilot of the one base station equals or surpasses the standard, and prepares a message directing more than one base station to transmit data simultaneously on their respective forward traffic channels when the quality of a single pilot of any of the base stations does not equal or surpass the standard; and
   a transmitter which transmits the message to the system controller via the plurality of base stations;
a system controller communicatively connected to the plurality of base stations and maintaining data queues for the mobile station's forward traffic data in those base stations contained in the mobile station's active set;
wherein the one base station receives, and transmits in response to, a message directing the one base station to transmit data from its data queue on its respective forward traffic channel; and
wherein the system controller receives a message directing more than one base station to transmit data simultaneously on their respective forward traffic channels and directs the respective base stations accordingly.

* * * * *